US009453108B2

(12) United States Patent
Boday et al.

(10) Patent No.: US 9,453,108 B2
(45) Date of Patent: Sep. 27, 2016

(54) FLAME RETARDANT PHT COMPOSITIONS

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 14/466,482

(22) Filed: Aug. 22, 2014

(65) Prior Publication Data

US 2016/0053053 A1 Feb. 25, 2016

(51) Int. Cl.
*C08G 73/06* (2006.01)
*C08G 73/02* (2006.01)
*C08G 73/00* (2006.01)

(52) U.S. Cl.
CPC ......... *C08G 73/0683* (2013.01); *C08G 73/026* (2013.01)

(58) Field of Classification Search
CPC ................................................... C08G 73/06
USPC .......................................................... 528/249
See application file for complete search history.

(56) References Cited

U.S. PATENT DOCUMENTS

| | | | |
|---|---|---|---|
| 2,889,277 | A | 6/1959 | Hughes |
| 3,340,232 | A | 9/1967 | Smith et al. |
| 3,598,748 | A | 8/1971 | Hirosawa |
| 3,875,186 | A | 4/1975 | Hein et al. |
| 3,957,742 | A | 5/1976 | Kveton |
| 4,106,904 | A | 8/1978 | Oude Alink et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,877,451 | A | 10/1989 | Winnik et al. |
| 5,112,796 | A | 5/1992 | Iannicelli |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 2009/0039018 | A1 | 2/2009 | Jordi et al. |
| 2010/0107476 | A1 | 5/2010 | Cosimbescu |
| 2012/0049308 | A1 | 3/2012 | Nishimura et al. |

FOREIGN PATENT DOCUMENTS

| | | |
|---|---|---|
| CN | 101265255 A | 9/2008 |
| EP | 2636697 A1 | 9/2013 |
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Wang Yulan et al., Synthesis and Properties of Poly-1, 3, 5-Triazines, Polymer Communications, No. 2, 1984, pp. 117-123.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702,1966.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

(Continued)

*Primary Examiner* — Duc Truong
(74) *Attorney, Agent, or Firm* — Patterson + Sheridan, LLP

(57) ABSTRACT

Hexahydrotriazine (HT) materials and hemiaminal (HA) materials derived from aromatic, aliphatic, and/or polyether diamines may be used as a platform for creating flame retardant materials. Various flame retardant material precursors may be incorporated into the HA and HT materials. Examples of flame retardant precursors may include organohalogen materials, organophosphorous materials, malamines, and dianiline compounds, among others. The flame retardant materials and precursors may be single molecule species, oligomers, and/or polymers (i.e., polyhexahydrotriazine, PHT, polyhemiaminal, PHA). The flame retardant materials may be made using an aromatic diamine, an aliphatic diamine, a polyether diamine, or a mixture thereof to react with an aldehyde (i.e. formaldehyde or paraformaldehyde). Such flame retardant material precursors will complex with the diamine monomers via a copolymerization reaction to form the flame retardant materials.

20 Claims, No Drawings

(56) References Cited

OTHER PUBLICATIONS

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Hiller, et al., "Laser-engravable hexahydrotriazine polymer networks," Mat Res Innovat (2002) 6:179-184.

Oliver, et al. "Measurement of hardness and elastic modulus by; instrumented indentation: Advances in understanding and; refinements to methodology," J. Mater. Res., vol. 19, No. 1, Jan. 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckling-based metrology for measuring; the elastic moduli of polymeric thin films," Nature Materials_Aug. 3, 2004, 545-550;Published online: Jul. 11, 2004.

FLAME RETARDANT PHT COMPOSITIONS

BACKGROUND

The present disclosure relates to flame retardant materials, and more specifically, to the use of hexahydrotriazine and hemiaminal molecules, oligomers, and polymers derived from aromatic, aliphatic, and/or polyether diamines to create flame retardant materials exhibiting flame retardant monomers covalently incorporated into a polymer matrix.

Flame retardant materials are commonly used for various applications where exposure to high heat or power may be encountered. Examples of industries that commonly utilize flame retardant materials include the automotive, aerospace, information technology, and telecommunications industries, among others. These industries generally require flame retardant materials to prevent or significantly reduce the propensity of a given material to burn to prevent catastrophic failures and costly remediation.

Common flame retardant materials are generally limited in application to the limitations associated with the polymers within which they are incorporated. These flame retardant materials also suffer from a lack of recyclability and often adversely affect the environment when the materials are disposed of. For example, if a flame retardant material cannot be effectively recycled, the material may be relegated to disposal in a landfill or other undesirable locale. The toxicity of flame retardant materials is often realized when the flame retardant leaches from the material into the surrounding environment. The environmental and biological toxicity of these materials often harm flora and fauna exposed to the leached materials. In addition, the flame retardant material cannot be re-used if the materials suffer from being non-recyclable, thus, increasing the cost of manufacturing new flame retardant materials.

Thus, what is needed in the art are improved flame retardant materials.

SUMMARY

In one embodiment, a method of preparing a flame retardant material is provided. The method includes providing an organic anhydride monomer functionalized with a flame retardant species and a diamine monomer. The organic anhydride monomer and the diamine monomer may be exposed to an aldehyde material and a flame retardant polymeric compound comprising a PHA or PHT material matrix may be formed.

In another embodiment, a method of preparing a flame retardant material is provided. The method includes providing an organic dianhydride monomer functionalized with a flame retardant species and a diamine monomer. The organic dianhydride monomer and the diamine monomer may be exposed to an aldehyde material and a flame retardant polymeric compound comprising a PHA or PHT material matrix may be formed.

In another embodiment, a method of preparing a flame retardant material is provided. The method includes preparing a flame retardant material comprising brominating phthalic anhydride monomer and reacting the brominated phthalic anhydride monomer with a diamine monomer. The flame retardant material may include an HA material having a plurality of trivalent hemiaminal groups having the structure

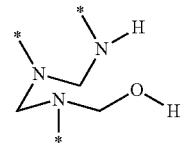 [SMILES: *NCN(*)CN(*)CO]

and
a plurality of bridging groups having the structure

y' may be 2 or 3 K' may be a divalent or trivalent radical comprising at least one 6-carbon aromatic ring.

In yet another embodiment, a method of preparing a flame retardant material is provided. The method includes preparing a flame retardant material comprising brominating a phthalic anhydride monomer and reacting the brominated phthalic anhydride monomer with a diamine monomer. The flame retardant material may include an HT material having a plurality of trivalent hexahydrotriazine groups having the structure

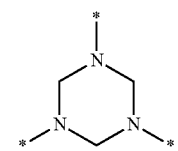 [SMILES: *N1CN(*)CN(*)C1]

and
a plurality of divalent bridging groups having the structure

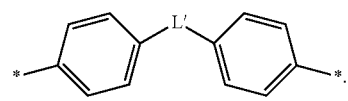

Each divalent bridging group may be bonded to two of the trivalent hexahydrotriazine groups and L' may be a divalent linking group.

DETAILED DESCRIPTION

Hexahydrotriazine (HT) materials and hemiaminal (HA) materials derived from aromatic, aliphatic, and/or polyether diamines may be used as a platform for creating flame retardant materials. Various flame retardant material precursors may be incorporated into the HA and HT materials. Examples of flame retardant precursors may include organohalogen materials, organophosphorous materials, melamines, and dianiline compounds, among others. The flame retardant materials and precursors may be single molecule species, oligomers, and/or polymers (i.e., polyhexahydrotriazine, PHT, polyhemiaminal, PHA). The flame retardant materials may be made using an aromatic diamine, an aliphatic diamine, a polyether diamine, or a mixture thereof to react with an aldehyde (i.e. formaldehyde or paraformaldehyde). Such flame retardant material precursors will complex with the diamine monomers via a copolymerization reaction to form the flame retardant materials.

A PHT material suitable for forming a flame retardant material as described herein is a molecule, oligomer, or polymer that has a plurality of trivalent hexahydrotriazine groups having the structure

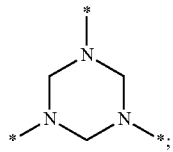

and
a plurality of divalent bridging groups of formula (2):

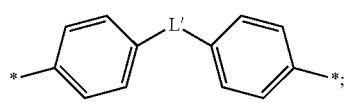

(2)

wherein is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hexahydrotriazine group is covalently linked to a respective one of the divalent bridging groups, and each starred bond of a given bridging group is linked to a respective one of the hexahydrotriazine groups. In one embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

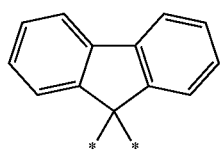

For PHT materials with bridging groups of formula (2), the HT may be represented by formula (3):

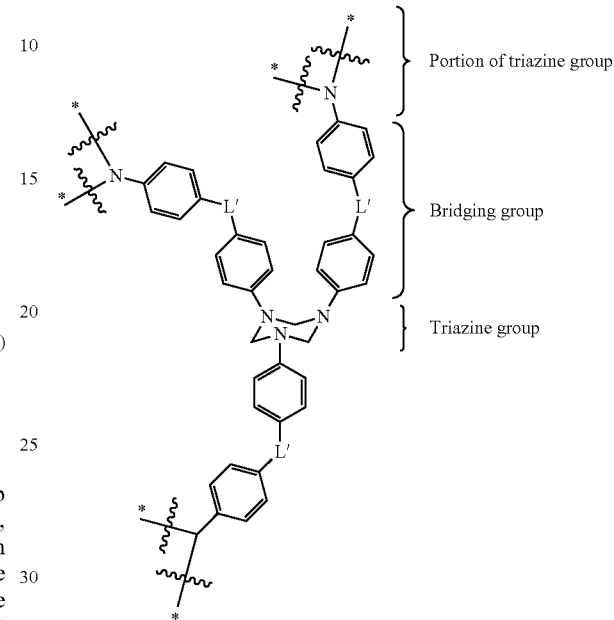

(3)

wherein L' is a divalent linking group selected from the group consisting of *—O—*, *—S—*, *—N(R')—*, *—N(H)—* *—R"—*, and combinations thereof, wherein R' and R" independently comprise at least 1 carbon. Each nitrogen having two starred wavy bonds in formula (3) is a portion of a different hexahydrotriazine group.

The PHT may also be represented by the notation of formula (4):

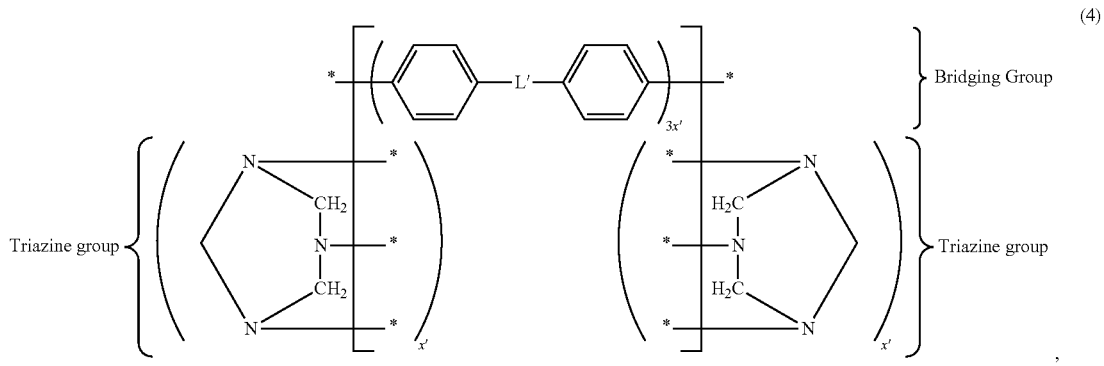

(4)

wherein x' is moles, L' is a divalent linking group selected from the group consisting of *—O—*, *—S—*, *—N(R')—*, *—N(H)—*, *—R''—*, and combinations thereof, wherein comprises at least 1 carbon and R'' comprises at least one carbon. Each starred bond of a given hexahydrotriazine group of formula (4) is covalently linked to a respective one of the bridging groups. Additionally, each starred bond of a given bridging group of formula (2) is covalently linked to a respective one of the hexahydrotriazine groups. Polymer molecules may be capped or terminated by a capping group in place of a bridging group in formulas (3) and (4). Examples of capping groups include $CH_3$, hydrogen atoms, ether groups, thioether groups, and dimethyl amino groups.

The PHT or HT can be bound non-covalently to water and/or a solvent (e.g., by hydrogen bonds).

Exemplary divalent bridging groups include:

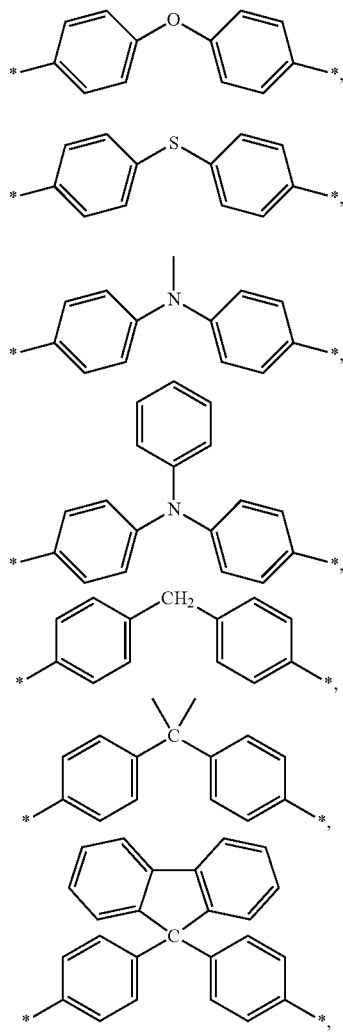

and combinations thereof.

A suitable PHT material may be made by forming a first mixture comprising i) one or more monomers comprising two aromatic primary amine groups, ii) an optional diluent monomer comprising one aromatic primary amine group, iii) paraformaldehyde, formaldehyde, and/or another suitable aldehyde, and iv) a solvent, and heating the first mixture at a temperature of about 50° C. to about 300° C., preferably about 165° C. to about 280° C., thereby forming a second mixture comprising a polyhexahydrotriazine. The heating time at any of the above temperatures can be for about 1 minute to about 24 hours. Diamine monomers suitable for making such PHT materials may have the general structure $H_2N$-Ar-L'-Ar-N—$H_2$, where Ar denotes a benzene ring group and L' is defined as described above. Diluent monomers suitable for including in the reaction are typically primary monoamines $RNH_2$, where the group R bonded to nitrogen has a structure according to formula (5), formula (6), formula (7), and/or formula (8):

(5)

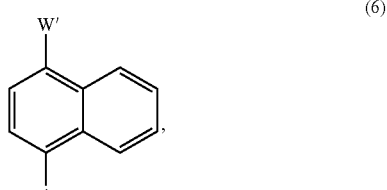

(6)

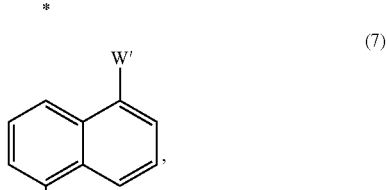

(7)

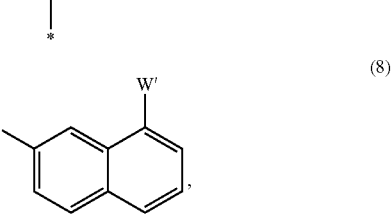

(8)

wherein W' is a monovalent radical selected from the group consisting of *—$N(R^1)(R^2)$, *—$OR^3$, —$SR^4$, wherein $R^1$, $R^2$, $R^3$, and $R^4$ are independent monovalent radicals comprising at least 1 carbon. The starred bonds in formulas (5), (6), (7), and (8) denote bonds with the nitrogen atom of the primary amine monomer. Non-limiting exemplary diluent groups include:

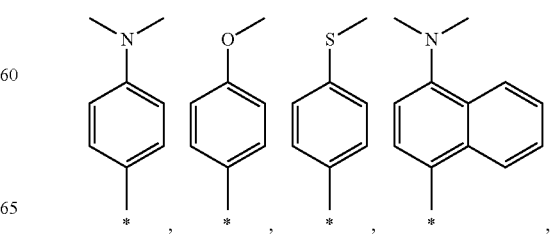

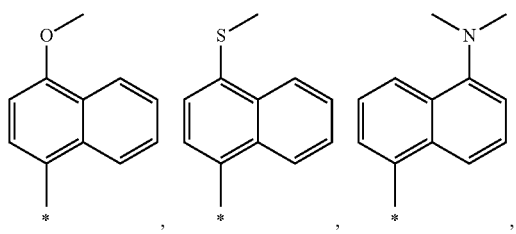

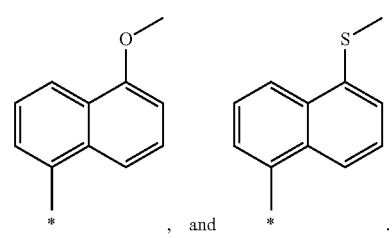

Diluent groups can be used singularly or in combination.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

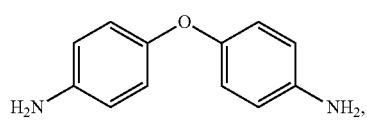

(ODA)

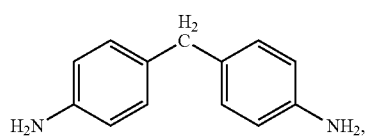

(MDA)

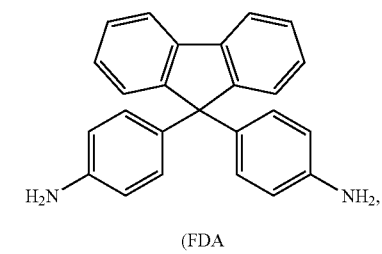

(FDA

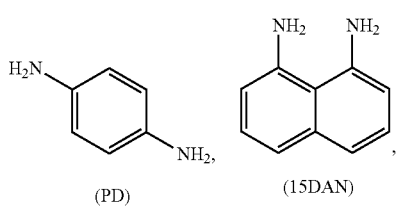

(PD) (15DAN)

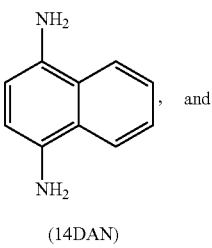

(14DAN)

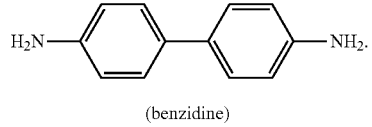

(benzidine)

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

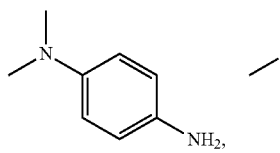

(DPD)            (MOA)

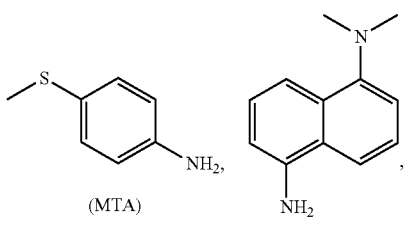

(MTA)            (15DMN)

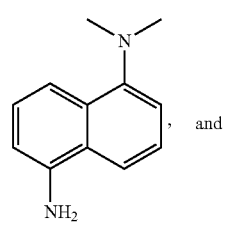

(14DMN)

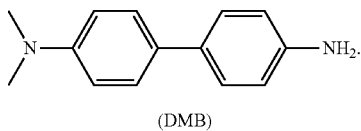

(DMB)

HT and HA material matrices may be used to incorporate flame retardant species to form flame retardant materials. It should be noted that many diamines will react with aldehydes, such as formaldehyde, to form flame retardant materials by incorporating the flame retardant species into the HT and/or HA polymer matrix. The incorporation of the flame retardant species into the HT and HA material matrices may be considered a copolymerization reaction between the diamine monomer and the flame retardant species in certain embodiments.

A related material that may be used to create a flame retardant is a hemiaminal (HA) material. A polyhemiaminal (PHA) is a crosslinked polymer comprising a plurality of trivalent hemiaminal groups of formula (9):

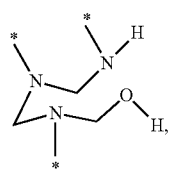
(9)

covalently linked to ii) a plurality of bridging groups of formula (10):

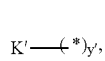
(10)

wherein y' is 2 or 3, and K' is a divalent or trivalent radical comprising at least one 6-carbon aromatic ring. In formulas (9) and (10), starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented by formula (11):

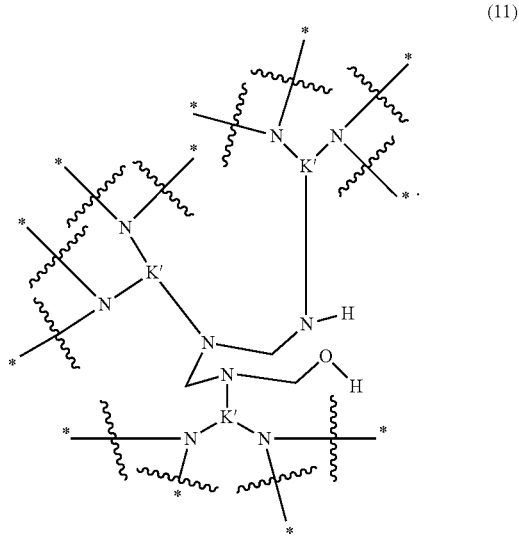
(11)

In this instance, each K' is a trivalent radical (y=3) comprising at least one 6-carbon aromatic ring. It should be understood that each nitrogen having two starred wavy bonds in formula (11) is a portion of a different hemiaminal group.

The structure of formula (11) can also be represented using the notation of formula (12):

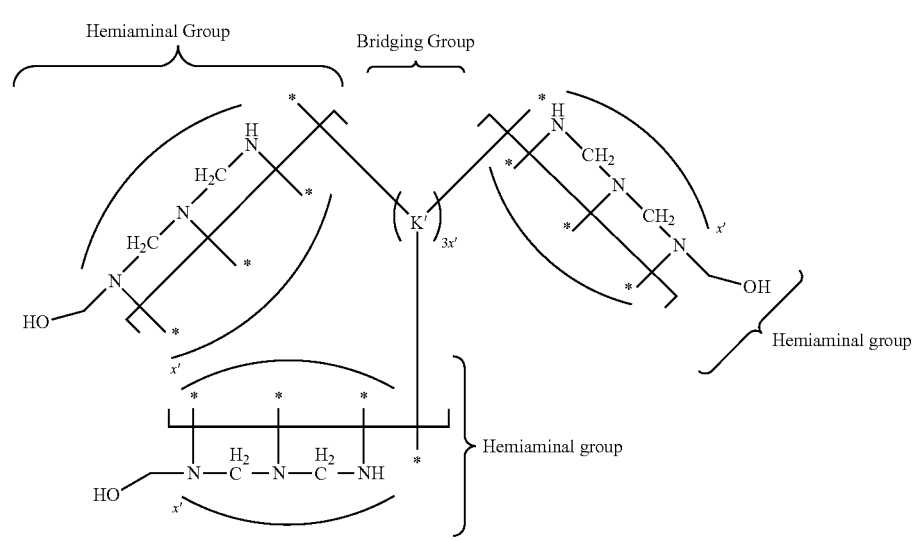
(12)

wherein x' is moles and each bridging group K' is a trivalent radical (y'=3 in formula (10)) comprising at least one 6-carbon aromatic ring. It should be understood that each starred nitrogen bond of a given hemiaminal group of formula (12) is covalently linked to a respective one of the bridging groups K'. Additionally, each starred bond of a given bridging group K' of formula (12) is covalently linked to a respective one of the hemiaminal groups.

Non-limiting exemplary trivalent bridging groups for HA materials include:

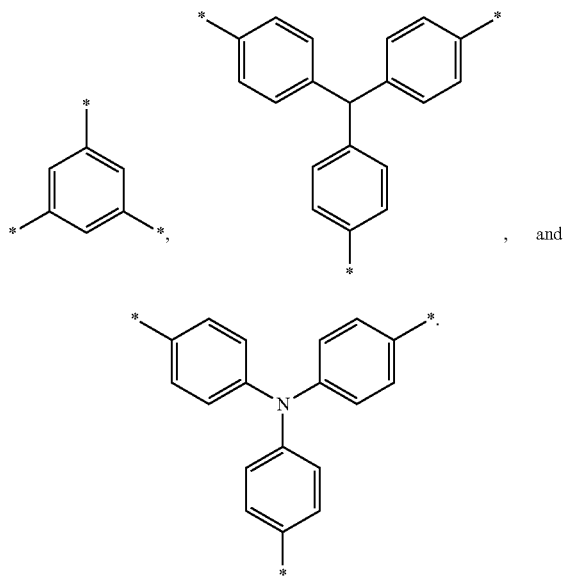

The bridging groups can be used singularly or in combination.

Polyhemiaminals composed of divalent bridging groups K' can be represented herein by formula (13):

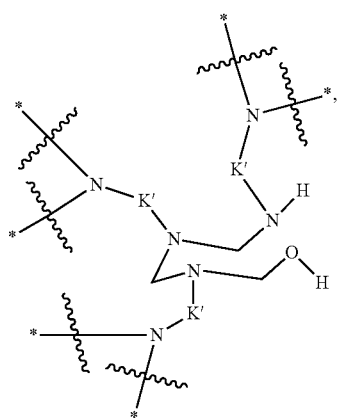

wherein K' is a divalent radical (y'=2 in formula (10)) comprising at least one 6-carbon aromatic ring. Each nitrogen having two starred wavy bonds in formula (13) is a portion of a different hemiaminal group.

More specific divalent bridging groups have the formula (14):

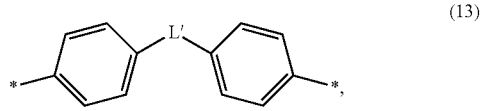

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH₂—*), isopropylidenyl (*—C(Me)₂-*), and fluorenylidenyl:

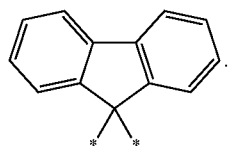 [SMILES: *C1(*)c2ccccc2-c2ccccc21]

Polyhemiaminals composed of divalent bridging groups of formula (14) can be represented herein by formula (15):

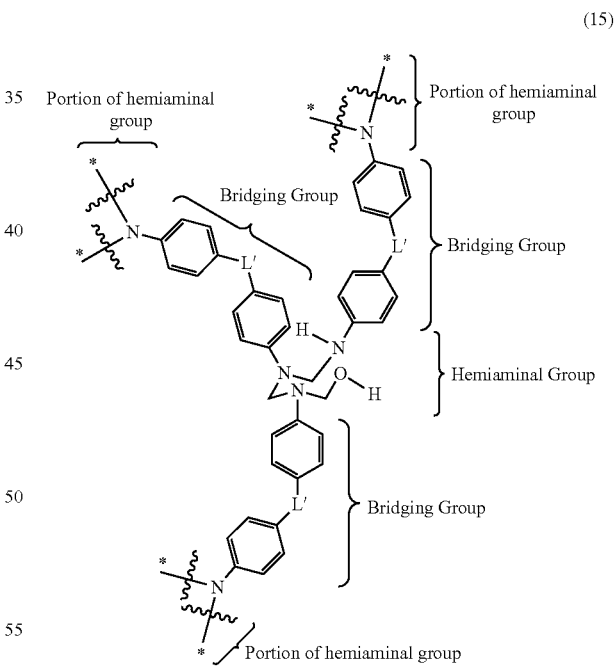

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (15) is a portion of a different hemiaminal group.

The polyhemiaminal of formula (15) can also be represented by the notation of formula (16):

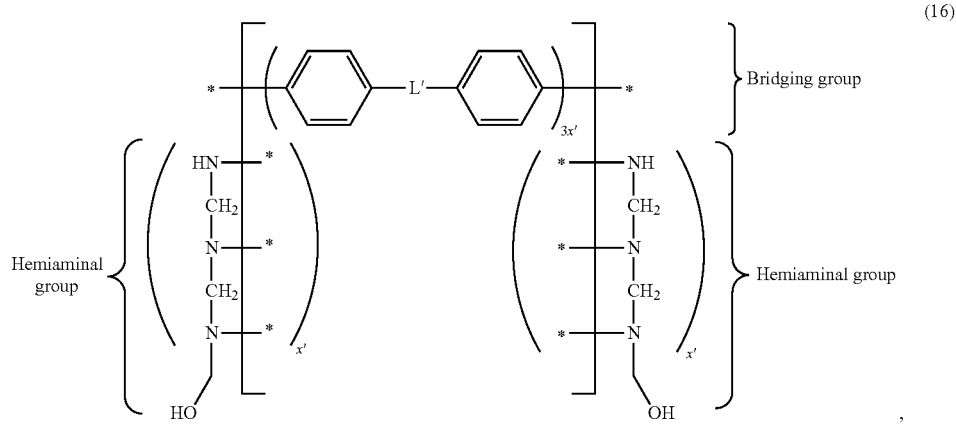

(16)

wherein x' is moles, and L' is a divalent linking group selected from the group consisting of *—O—*, *—S—*, *—N(R')—*, *—N(H)—*, *—R"—*, and combinations thereof, wherein R' and R" independently comprise at least 1 carbon. Each starred nitrogen bond of a given hemiaminal group of formula (16) is covalently linked to a respective one of the bridging groups. Additionally, each starred bond of a given bridging group of formula (16) is covalently linked to a respective one of the hemiaminal groups.

The hemiaminal groups can be bound non-covalently to water and/or a solvent. A non-limiting example is a hemiaminal group that is hydrogen bonded to two water molecules as shown in formula (17):

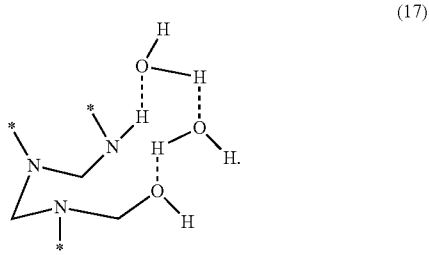

(17)

In some embodiments, a hemiaminal material may form a covalent network with water molecules that may be a polyhemiaminal hydrate (PHH). A PHA material of this form may be made, for example, by reaction of polyethylene glycol oligomers with paraformaldehyde. Such materials may be organogels in some cases.

Typical HT and HA polymers and oligomers, and PHH materials, as described herein may be disassembled in aqueous solutions, HT oligomers and polymers will disassemble into monomers and may dissolve in acid solutions having pH less than about 3, such as less than about 2.5, for example less than about 2. PHH materials may disassemble into monomers in neutral water. Such properties may be useful in removing flame retardant species from the polymer matrix. Various flame retardant species, which often exhibit varying degrees of environmental and biological toxicity, may be recovered from the polymer matrix and properly disposed of. The ability to disassemble the flame retardant materials allows the flame retardant species to be properly disposed of and the HT or HA monomers to be reused. Thus, the flame retardant materials may be environmentally friendly, recyclable, and provide for cost effective reutilization of the flame retardant material precursors.

An HA, material suitable for use according to the methods described herein may be made using the same groups of reactants as for the HT materials. The diluent monomers described above may also be used to make HA materials. A method of preparing a polyhemiaminal (PHA) comprising divalent bridging groups comprises forming a first mixture comprising i) a monomer comprising two or more primary aromatic amine groups, ii) an optional diluent monomer comprising one aromatic primary amine group, iii) paraformaldehyde, and iv) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups. The mole ratio of paraformaldehyde: total moles of primary aromatic amine groups (e.g., diamine monomer plus optional monoamine monomer) may be about 1:1 to about 1.25:1, based on one mole or equivalent of paraformaldehyde equal to 30 grams. The solvent can be any suitable solvent. Exemplary solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), N-cyclohexyl-2-pyrrolidone (CHP), N,N'-dimethylpropyleneurea (DMPU), and propylene glycol methyl ether acetate (PGMEA).

A PHT material may be prepared from a PHA material. The PHT can be prepared by heating a solution comprising the PHA at a temperature of at least 50° C., such as about 165° C. to about 280° C. or about 180° C. to about 220° C., for example at about 200° C. for about 1 minute to about 24 hours. Additionally, a mixed PHA/PHT copolymer may be made by partially converting a PHA material to a PHT material. A combination of low conversion temperature, for example about 150° C. to about 165° C., and short conversion time, for example about 1 minute to about 10 minutes, may be used to make a mixed PHA/PHT material.

An exemplary PHA material may be made by reaction of 4,4'-oxydianiline (ODA) with paraformaldehyde (PF). The product is a powder or solid plastic.

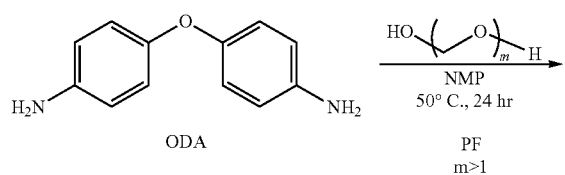

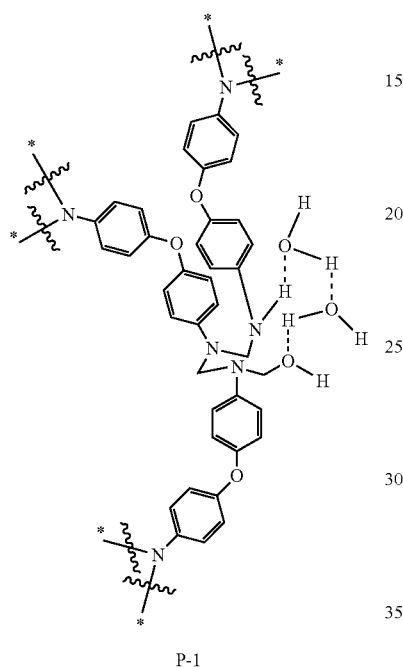

P-1

4,4'-Oxydianilin (ODA, 0.20 g, 1.0 mmol) and paraformaldehyde 0.15 g, 5.0 mmol, 5 equivalents (eq.)) were weighed out into a 2-Dram vial inside a $N_2$-filled glovebox, N-methylpyrrolidone (NMP, 6.2 g, 6.0 mL, 0.17 M) was added. The vial was capped but not sealed. The reaction mixture was removed from the glovebox, and heated in an oil bath at 50° C. for 24 hours (after approximately 0.75 hours, the polymer begins to precipitate). The polyhemiaminal P-1 was precipitated in acetone or water, filtered and collected to yield 0.22 g, >98% yield as a white solid.

A second exemplary PHA material may be prepared by reaction of 4,4'-methylenedianiline (MDA) with PF:

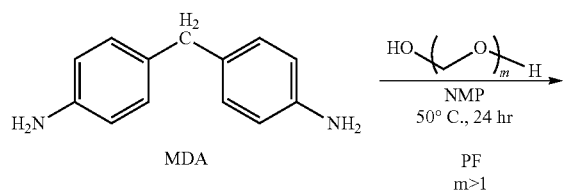

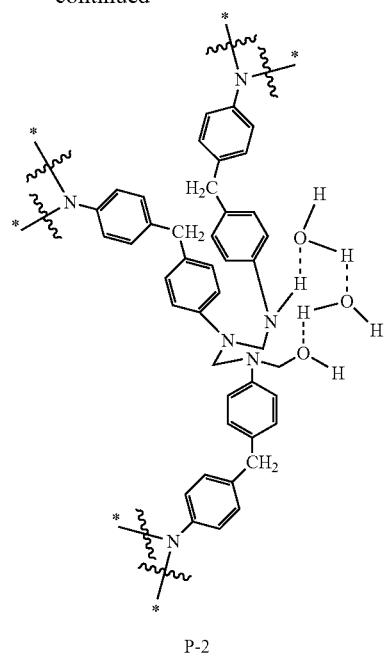

P-2

ODA was substituted with 4,4'-methylenedianiline (MDA) and a mole ratio of MDA to PF of 1:5 was used. Solid yield of 0.15 g, 69%, was an amorphous, insoluble off-white powder.

A PHT material may be prepared by reaction of ODA and PF, as follows:

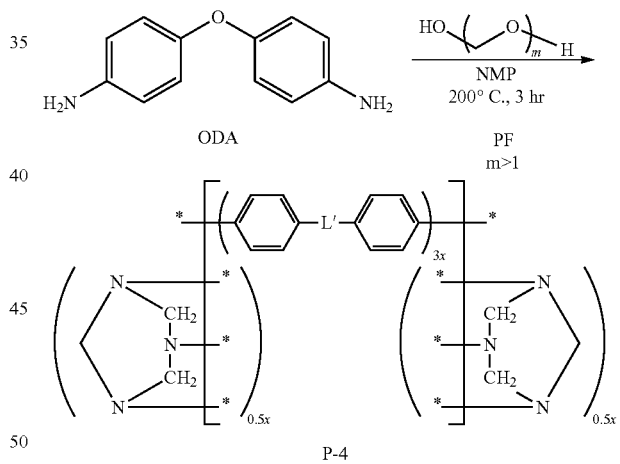

P-4, a polyhexahydrotriazine, was prepared by reaction of 4,4'-oxydianiline (ODA) with paraformaldehyde (PF), ODA (0.20 g, 1.0 mmol) and PF (0.15 g, 5.0 mmol, 2.5 eq.) were weighed out into a 2-Dram vial inside a $N_2$-filled glovebox. NMP (6.2 g, 6.0 mL, 0.17 M) was added. The reaction mixture was removed from the glovebox, and heated in an oil bath at 200° C. for 3 hours (after approximately 0.25 hours, the polymer begins to gel in the NMP). The solution was allowed to cool to room temperature and the polymer was precipitated in 40 mL of acetone, allowed to soak for 12 hours, then filtered and dried in a vacuum oven overnight and collected to yield 0.21 g, 95% yield of P-4 as an off-white solid.

In one example, an organic anhydride functionalized with a flame retardant species, such as tetrabromophthalic anhydride, and a diamine monomer, such as 4,4'-oxydianiline (ODA), may be reacted with an aldehyde (i.e. formaldehyde or paraformaldehyde) and subsequently cured to enhance covalent cross-linking of the resulting flame retardant material via condensation reactions. Solvents described above, such as dipolar aprotic solvents, may also be utilized to facilitate formation of the flame retardant materials. In one embodiment, the curing of the flame retardant material may be performed by heating the reaction mixture to between about 50° C. and about 280° C., such as greater than about 180° C., for example, about 200° C. An exemplary monofunctional embodiment for forming the flame retardant materials is shown below.

Monofunctional Approach

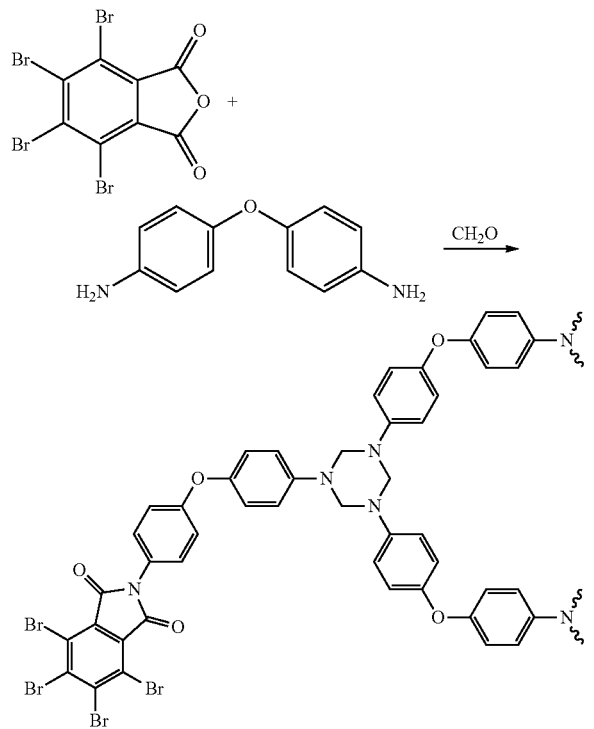

In the monofunctional embodiment shown above, the tetrabromophthalic anhydride is added to the PHT polymerization ODA reacted with formaldehyde/paraformaldehyde). The copolymerization reaction results in the ring opening of the anhydride to create an imide which is covalently bound into the resulting flame retardant PHT material matrix. The reaction product may be considered a polyimide/PHT copolymer in certain embodiments. Each nitrogen having two starred wavy bonds may be a portion of a different hexahydrotriazine group. In this embodiment, the flame retardant precursor may end terminate or cap the flame retardant material. As such, the monofunctional embodiment may be useful for forming flame retardant material oligomers.

In another example, an organic dianhydride functionalized with a flame retardant species, such as bis(tribromophthalic)dianhydride, and a diamine monomer, such as 4,4'-oxydianiline (ODA), may be reacted with an aldehyde (i.e. formaldehyde or paraformaldehyde) and subsequently cured to enhance covalent cross-linking of the resulting flame retardant material via condensation reactions. Solvents described above, such as dipolar aprotic solvents, may also be utilized to facilitate formation of the flame retardant materials. In one embodiment, the curing of the flame retardant material may be performed by heating the reaction mixture to between about 50° C. and about 280° C., such as greater than about 180° C., for example, about 200° C. An exemplary bisfunctional embodiment for forming the flame retardant materials is shown below.

Bisfunctional Approach

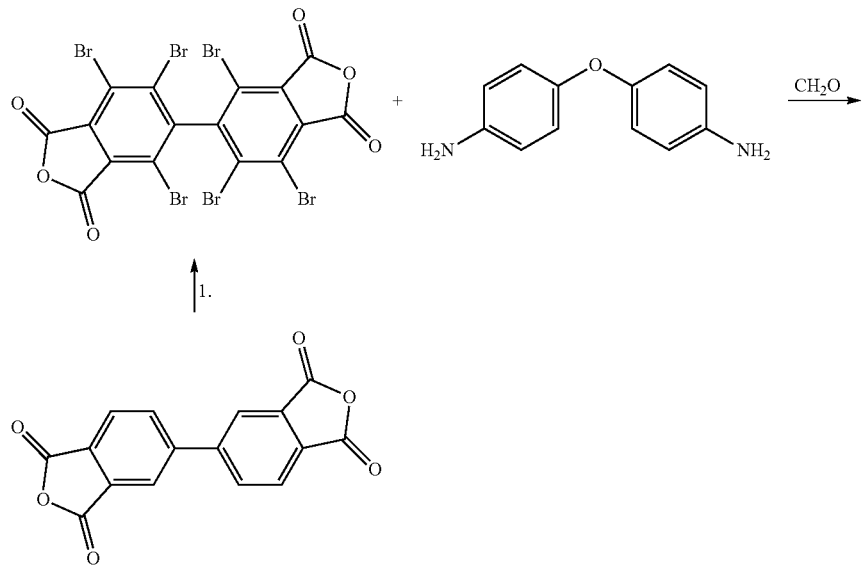

-continued

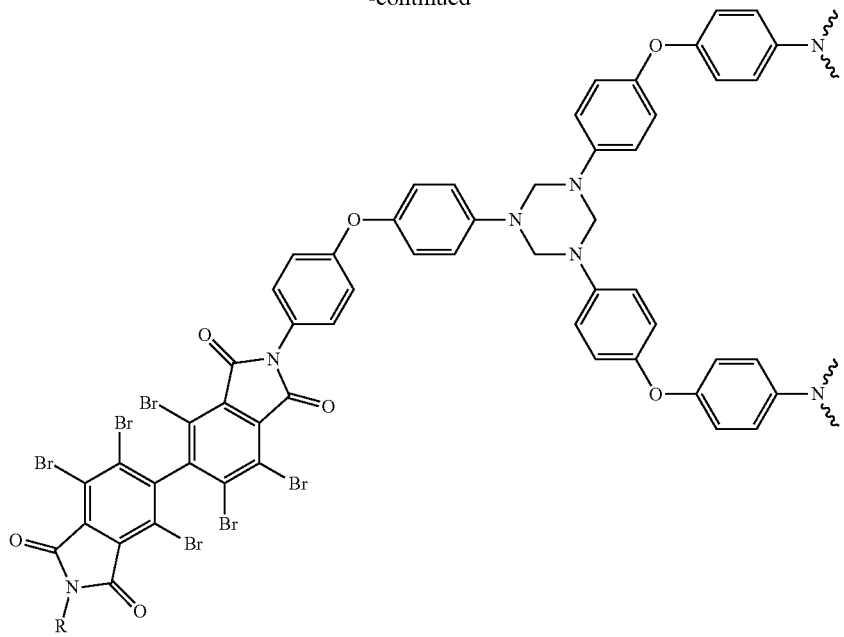

In the bisfunctional embodiment shown above, the bis(tribromophthalic)dianhydride is added to the PHT polymerization (i.e. ODA reacted with formaldehyde/paraformaldehyde). As shown, biphthalic dianhydride may be brominated prior to performing the copolymerization reaction. The reaction results in the ring opening of the anhydrides to create imides which are covalently bound into the resulting flame retardant PHT material matrix. The reaction product may be considered a polyimide/PHT copolymer in certain embodiments. Each nitrogen having two starred wavy bonds may be a portion of a different hexahydrotriazine group. The functional group R may be a bridging group. By utilizing a dianhydride flame retardant monomer, additional polymerization and a higher degree of covalent cross-linking within the polymer matrix may be achieved when compared to the monofunctional embodiment.

With regard to the monofunctional and bisfunctional embodiments described above, bromination of the anhydride monomers may be performed by any convenient method. An exemplary bromination process is described in U.S. Pat. No. 3,875,186, which is incorporated herein by reference in its entirety. Non-limiting examples of other flame retardant material precursors which may be incorporated into the PHT/PHA polymer matrix via a copolymerization reaction include phosphates, melamines, and various dianiline compounds. One example of a dianiline compound which may be incorporated into the PHT/PHA polymer matrix is 4,4'-(Hexafluoroisopropylidene)bis(p-phenyleneoxy)dianiline.

In addition to the embodiments described above, other methods of forming flame retardant materials are contemplated. For example, in either the monofunctional or bisfunctional embodiments, the anhydrides may be pre-reacted with bis aminos to create an amine that is covalently bound into the PHT/PHA matrix similar to the ODA as described above. The amine may be functionalized with a flame retardant species (i.e. by bromination or phosphorylation) prior to exposure to the aldehyde.

Further, it is contemplated that a diamine monomer may be functionalized with a flame retardant species and subsequently reacted to form a PHT/PHA flame retardant material. In this embodiment, anhydride monomers may not be necessary to form the flame retardant materials. Alternatively, anhydride monomers may be copolymerized with a flame retardant functionalized diamine to form a polyimide and PHA/PHT copolymer. In one example, a brominated diamine monomer may be utilized. An exemplary brominated diamine monomer is shown below. Although the R group shown below is a brominated organic material, it is contemplated that any suitable halogenated organic material may be incorporated into the diamine monomer.

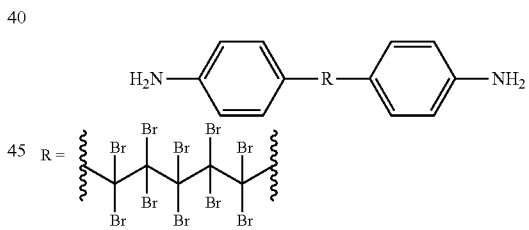

The flame retardant materials and flame retardant material precursors described herein may be included in a composite material that may be used as a flame retardant material in any of the embodiments described herein. Any desired blend material for a composite may be added to the reaction mixture of diamine and aldehyde prior to formation of a reaction product. For example, reactants may be mixed at a non-reacting temperature, for example less than about 50° C. for some embodiments, and a solid polymer material, for example a powder, a fiber aggregate, or a nanotube aggregate, may be added. The resulting combination may be mixed as the temperature is increased to form a reaction product. Any desired polymer may form a composite material with an HA, HT, or PHH material to provide selected properties. Carbon nanotubes may also form a composite with HA, HT, or PHH materials to provide additional mechanical integrity in certain flame retardant material applications.

The flame retardant materials described herein may exhibit various advantageous properties including high modulus, solvent resistance, and environmental stress crack resistance, among others. However, the flame retardant materials may be chemically reverted to the monomers via treatment with strong acid. Thus, the flame retardant materials may be recycled or reworked as desired. The recyclability of these flame retardant materials is especially suitable for environmentally friendly disposal of the materials. In sum, the materials provide a covalently bound flame retardant species within the polymer matrix and efficient and cost effective recyclability of the flame retardant materials. It is contemplated that the flame retardant material may provide various benefits over current flame retardant materials and may be applicable across various industries.

While the foregoing is directed to example embodiments of the present disclosure, other and further embodiments may be devised without departing from the basic scope thereof, and the scope thereof is determined by the claims that follow.

What is claimed is:

1. A method of forming a flame retardant material, comprising:
   providing an organic anhydride monomer functionalized with a flame retardant species;
   providing a diamine monomer;
   exposing the organic anhydride monomer and the diamine monomer to an aldehyde material; and
   forming a flame retardant polymeric compound comprising a PHA or PHT material matrix.

2. The method of claim 1, wherein the organic anhydride monomer comprises phthalic anhydride.

3. The method of claim 2, wherein the diamine monomer comprises ODA.

4. The method of claim 1, wherein the PHA or PHT material comprises an aromatic bridging group.

5. The method of claim 2, wherein the flame retardant species comprises a halogen based aromatic material.

6. The method of claim 1, wherein the flame retardant species is selected from the group consisting of halogen based materials, phosphate materials, melamine materials, and dianiline materials.

7. The method of claim 1, wherein the organic anhydride monomer functionalized with a flame retardant species comprises tetrabromophthalic anhydride.

8. The method of claim 1, wherein the flame retardant polymeric compound is formed by a process comprising:
   forming a mixture comprising one or more monomers comprising two aromatic primary amine groups having the general structure H$_2$N-Ar-L'-Ar-N—H$_2$, wherein Ar denotes a benzene ring group and L' is a divalent linking group, and a solvent; and
   heating the mixture at a temperature of about 50° C. to about 280° C. for about 1 minute to about 24 hours.

9. The method of claim 1, wherein the exposing the organic anhydride monomer and the diamine monomer to an aldehyde material comprises forming an imide moiety which is covalently bound to the PHA or PHT material matrix.

10. A method of forming a flame retardant material, comprising:
    providing an organic dianhydride monomer functionalized with a flame retardant species;
    providing a diamine monomer;
    exposing the organic dianhydride monomer and the diamine monomer to an aldehyde material; and
    forming a flame retardant polymeric compound comprising a PHA or PHT material matrix.

11. The method of claim 10, wherein the organic anhydride monomer comprises biphthalic dianhydride.

12. The method of claim 11, wherein the diamine monomer comprises ODA.

13. The method of claim 10, wherein the PHA or PHT material comprises an aromatic bridging group.

14. The method of claim 11, wherein the flame retardant species comprises a halogen based aromatic material.

15. The method of claim 10, wherein the flame retardant species is selected from the group consisting of halogen based materials, phosphate materials, melamine materials, and dianiline materials.

16. The method of claim 10, wherein the organic anhydride monomer functionalized with a flame retardant species comprises bis(tribromophthalic)dianhydride.

17. The method of claim 10, wherein the flame retardant polymeric compound is formed by a process comprising:
    forming a mixture comprising one or more monomers comprising two aromatic primary amine groups having the general structure H$_2$N-Ar-L'-Ar-N—H$_2$, wherein Ar denotes a benzene ring group and L' is a divalent linking group, and a solvent; and
    heating the mixture at a temperature of about 50° C. to about 280° C. for about 1 minute to about 24 hours.

18. The method of claim 1, wherein the exposing the organic anhydride monomer and the diamine monomer to an aldehyde material comprises forming an imide moiety which is covalently bound to the PHA or PHT material matrix.

19. A method of forming a flame retardant material, comprising:
    providing an organic dianhydride monomer functionalized with a flame retardant species;
    providing a diamine monomer;
    exposing the organic dianhydride monomer and the diamine monomer to an aldehyde material; and
    forming a flame retardant polymeric compound comprising a PHA or PHT material matrix with a plurality of bridging groups having the structure

wherein y' is 2 or 3, and K' is a divalent or trivalent radical comprising at least one 6-carbon aromatic ring.

20. A method of forming a flame retardant material, comprising:
    providing an organic dianhydride monomer functionalized with a flame retardant species;
    providing a diamine monomer;
    exposing the organic dianhydride monomer and the diamine monomer to an aldehyde material; and
    forming a flame retardant polymeric compound comprising a PHA or PHT material matrix with a plurality of divalent bridging groups having the structure

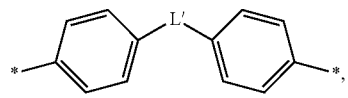

wherein L' is a divalent linking group.

* * * * *